United States Patent
Bodas et al.

(10) Patent No.: US 10,996,737 B2
(45) Date of Patent: May 4, 2021

(54) METHOD AND APPARATUS TO IMPROVE ENERGY EFFICIENCY OF PARALLEL TASKS

(71) Applicant: Intel Corporation, Santa Clara, CA (US)

(72) Inventors: Devadatta V. Bodas, Federal Way, WA (US); Muralidhar Rajappa, Chandler, AZ (US); Justin J. Song, Olympia, WA (US); Andy Hoffman, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 120 days.

(21) Appl. No.: 15/087,095

(22) Filed: Mar. 31, 2016

(65) Prior Publication Data
US 2017/0285717 A1    Oct. 5, 2017

(51) Int. Cl.
*G06F 9/52*     (2006.01)
*G06F 1/324*    (2019.01)
*G06F 1/3228*   (2019.01)

(52) U.S. Cl.
CPC .......... *G06F 1/324* (2013.01); *G06F 1/3228* (2013.01); *Y02D 10/00* (2018.01)

(58) Field of Classification Search
CPC ....... G06F 9/5094; G06F 9/522; G06F 1/3228
See application file for complete search history.

(56) References Cited

U.S. PATENT DOCUMENTS

| | | |
|---|---|---|
| 7,210,048 B2 | 4/2007 | Bodas |
| 7,421,623 B2 | 9/2008 | Haugh |
| 7,724,149 B2 | 5/2010 | Kettler, III et al. |
| 8,578,079 B2 | 11/2013 | de Cesare et al. |
| 8,631,411 B1 | 1/2014 | Ghose |
| 2005/0278520 A1 | 12/2005 | Hirai et al. |
| 2006/0107262 A1 | 5/2006 | Bodas et al. |
| 2006/0241880 A1 | 10/2006 | Forth et al. |
| 2008/0172398 A1 | 7/2008 | Borkenhagen et al. |
| 2008/0301479 A1 | 12/2008 | Wood |
| 2009/0037926 A1 | 2/2009 | Dinda et al. |
| 2009/0049313 A1 | 2/2009 | Gooding et al. |
| 2009/0070611 A1 | 3/2009 | Bower, III et al. |
| 2009/0100437 A1 | 4/2009 | Coskun et al. |
| 2009/0144566 A1 | 6/2009 | Bletsch et al. |
| 2009/0235097 A1 | 9/2009 | Hamilton et al. |
| 2010/0094475 A1 | 4/2010 | Masters et al. |

(Continued)

OTHER PUBLICATIONS

PCT Application No. PCT/US2017/017023, International Search Report and the Written Opinion, dated May 24, 2017, 15 pgs.

(Continued)

*Primary Examiner* — Albert Wang
(74) *Attorney, Agent, or Firm* — Green, Howard & Mughal LLP

(57) ABSTRACT

A system with improved power performance for tasks executed in parallel. A plurality of processing cores each to execute tasks. An inter-core messaging unit to conveys messages between the cores. A power management agent transitions a first core into a lower power state responsive to the first core waiting for a second core to complete a second task. In some embodiments long messages are subdivided to allow a receiving core to resume useful work sooner.

16 Claims, 4 Drawing Sheets

(56) References Cited

U.S. PATENT DOCUMENTS

| | | |
|---|---|---|
| 2010/0169528 A1 | 7/2010 | Kumar |
| 2011/0010717 A1 | 1/2011 | Yamaoka et al. |
| 2011/0072505 A1 | 3/2011 | Ott |
| 2011/0138395 A1 | 6/2011 | Wolfe |
| 2011/0154348 A1 | 6/2011 | Elnozahy et al. |
| 2011/0185364 A1 | 7/2011 | Fernandes et al. |
| 2011/0231860 A1 | 9/2011 | Kazama et al. |
| 2012/0030493 A1 | 2/2012 | Cepulis et al. |
| 2012/0072389 A1 | 3/2012 | Aldridge et al. |
| 2012/0109705 A1 | 5/2012 | Belady et al. |
| 2013/0042118 A1 | 2/2013 | Robben et al. |
| 2013/0047011 A1 | 2/2013 | Dice |
| 2013/0054987 A1 | 2/2013 | Pfeiffer et al. |
| 2013/0086404 A1 | 4/2013 | Sankar et al. |
| 2013/0205092 A1 | 8/2013 | Roy et al. |
| 2014/0189301 A1 | 7/2014 | Gorbatov et al. |
| 2014/0215487 A1 | 7/2014 | Cherkasova et al. |
| 2014/0281647 A1 | 9/2014 | Bodas et al. |
| 2014/0298047 A1 | 10/2014 | Holler et al. |
| 2015/0067356 A1 | 3/2015 | Trichy Ravi et al. |
| 2015/0113304 A1 | 4/2015 | Kim |
| 2015/0309845 A1* | 10/2015 | Wilson .................. G06F 9/522 718/106 |

OTHER PUBLICATIONS

International Preliminary Report on Patentability dated Oct. 2, 2018 for PCT Patent Application No. PCT/US2017/017023.

* cited by examiner

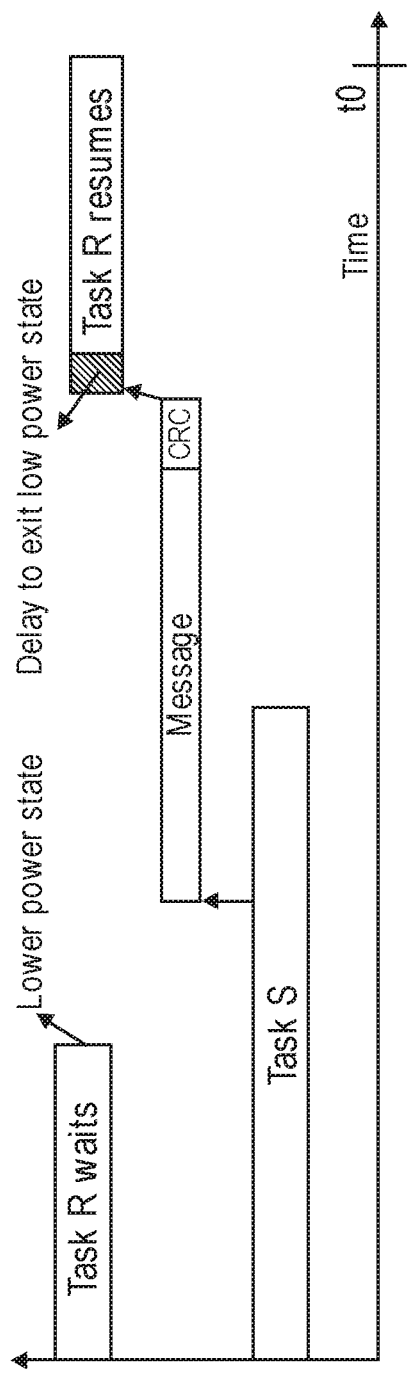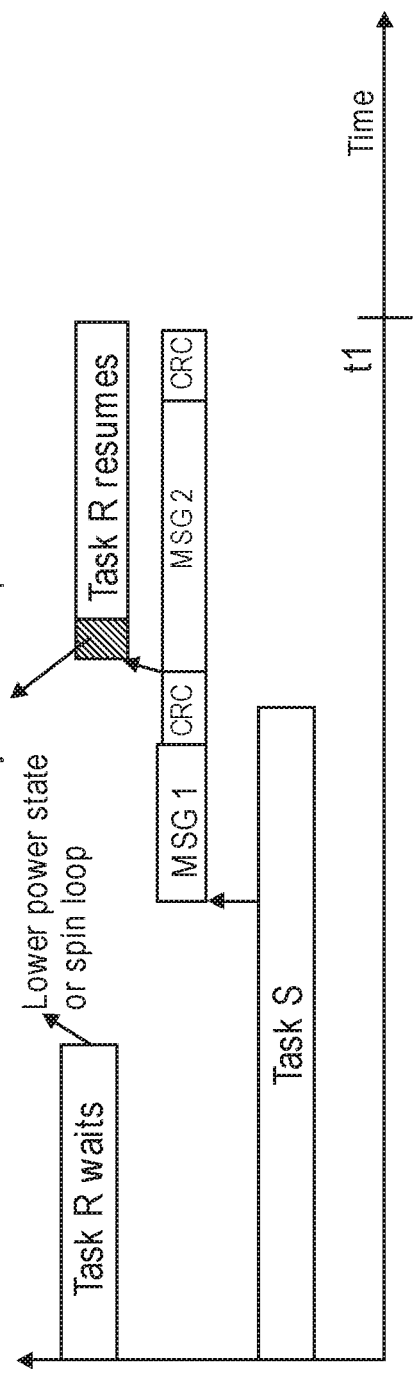

METHOD AND APPARATUS TO IMPROVE ENERGY EFFICIENCY OF PARALLEL TASKS

BACKGROUND

Field

Embodiments of the invention relate to high-performance computing. More specifically, embodiments of the invention relate to improving power consumption characteristics in system executing parallel tasks.

Background

Generally, power consumption has become an important issue in high-performance computing (HPC). Typical HPC environments divide the processing task between a number of different computing cores so these tasks can be performed in parallel. At different points, data is required to be exchanged between the different tasks. Such times are generally referred to as "synchronization points" because they require that the tasks be synchronized, that is, have reached the same point in execution so that the exchanged data is valid. Because all tasks do not require the same amount of time to reach the synchronization point, early arrivers must wait for the other tasks to get to that synchronization point. Generally, the task calls a wait routine and executes a spin loop until other tasks arrive at the same synchronization point. Unfortunately, in the spin loop, the core continues to consume significant energy.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

FIGS. 2A-2D show timing diagrams of operation according to embodiments of the invention.

DETAILED DESCRIPTION

Figure 1:
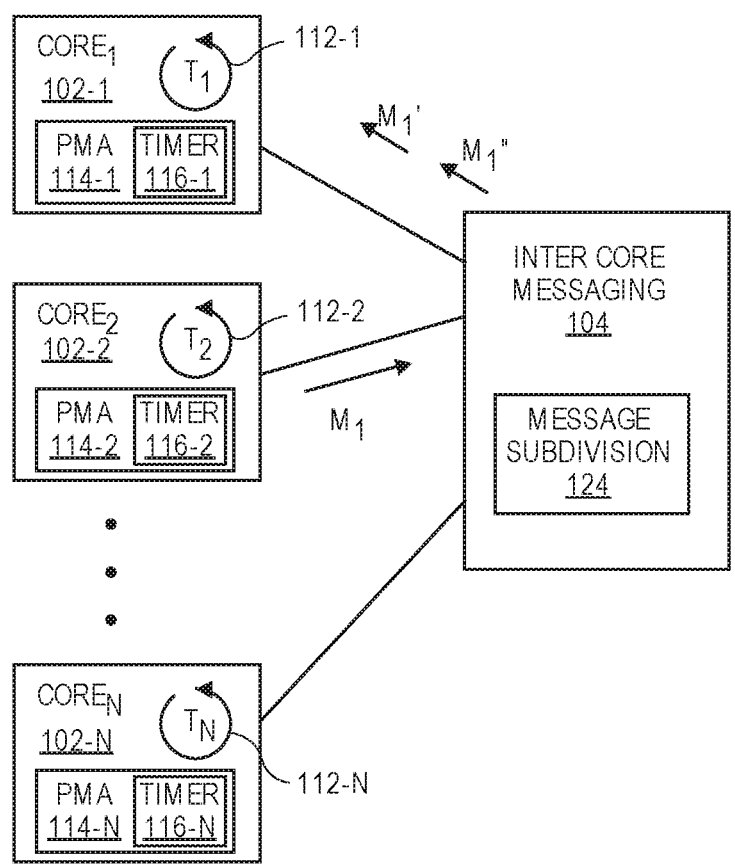
FIG. 1 is a block diagram of a system according to one embodiment of the invention.

FIG. 1 is a block diagram of a system according to one embodiment of the invention. A plurality of processing cores 102-1, 102-2, 102-n (generically, core 102) are provided to process tasks in parallel. For example, core 102-1 processes task 112-1, core 102-2 processes task 112-2, and core 102-N processes task 112-N. "Task," "thread" and "process" are use herein interchangeably to refer to an instance of executable software or hardware. The number of cores 102 can be arbitrarily large. Each core 102 includes a corresponding power management agent 114-1, 114-2-, 114-N (generically, power management agent 114). Power management agent 114 may be implemented as software, hardware, microcode etc. The power management agent 114 is used to place its core 102 in a lower power state when it reaches a synchronization point before other cores 102 processing other tasks 112. As used herein, "synchronization point" refers to any point in the processing where the further processing is dependent on receipt of data from another core in the system.

An inter-core messaging unit 104 provides messaging services between the different processing cores 102. In one embodiment, inter-core messaging unit 104 adheres to the message passing interface (MPI) protocol. When core 102-1 reaches a synchronization point, it calls a wait routine. For example, it may call MPI-wait from the inter-core messaging unit 104. In one embodiment, responsive to the call of the wait messaging routine, the power management agent 114-1 transitions core 102-1 into a lower power state. This may take the form of reducing core and/or its power domain power by employing whatever applicable power saving technology such as DVFS (dynamic voltage frequency scaling), gating, parking, offlining, throttling, non-active states, or standby states. In other embodiments, the power management agent 114 includes or has access to a timer 116-1, 116-2, 116-N, respectively (generically, timer 116) that delays entry into the low power state for a threshold period. Generally, there is a certain amount of overhead in entering and leaving the low power state. It has been found empirically that if all cores reach a synchronization point within a relatively short period of time, power consumption characteristics are not meaningfully improved, and in some cases, are diminished by immediate transition upon the call of the wait routine. However, since tasks 112 may execute for minutes, hours, or even longer beyond some relatively short threshold, the power savings of transitioning to a lower power state are quite significant. In embodiments where the timer 116-1 is present, the core 102-1 will still enter the spin loop until transitioned into a lower power state. As used herein, "spin loop" refers to either a legacy spin-loop (checking one flag and immediately going to itself) or any other low latency state which can be immediately exited once a condition that caused a thread/core to wait has been met.

In one example, core 102-1 may be waiting for a message $M_1$ from core 102-2. In one embodiment, message $M_1$ is sent to inter-core messaging unit 104. If message $M_1$ exceeds a threshold length, inter-core messaging unit 104 subdivides the message into two submessages using a message subdivision unit 124. Submessages Wand Ware sent sequentially to core 102-1. Each submessage includes its own message validation value, such as cyclic redundancy check (CRC) values, to allow the submessage to be validated individually. By subdividing the message, power savings can be achieved while improving processing performance. This is because power management agent 114-1 can transition core 102-1 into a higher power state once message $M_1'$ is received and validated without waiting for the entire message (the remainder $M_1''$) to be received. Thus, core 102-1 exits the spin loop or enters the higher power state sooner so there is less power chum, and begins processing message $M_1'$ while receiving message $M_1''$. Of course, if $M_1''$ fails to validate, core 102-1 will need to invalidate message $M_1'$ and request retransmission of the entire $M_1$ message, but as message failure transmissions are relatively infrequent, improved power savings and execution by virtue of the message subdivision generally results.

Figure 2A:
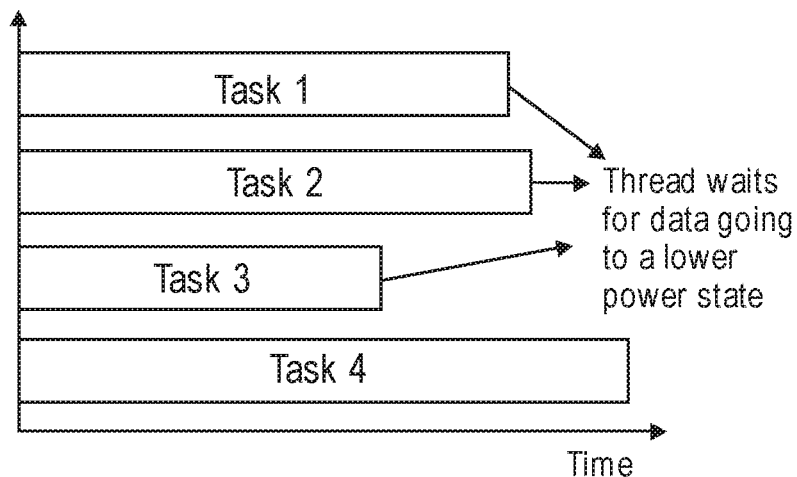
Figure 2B:
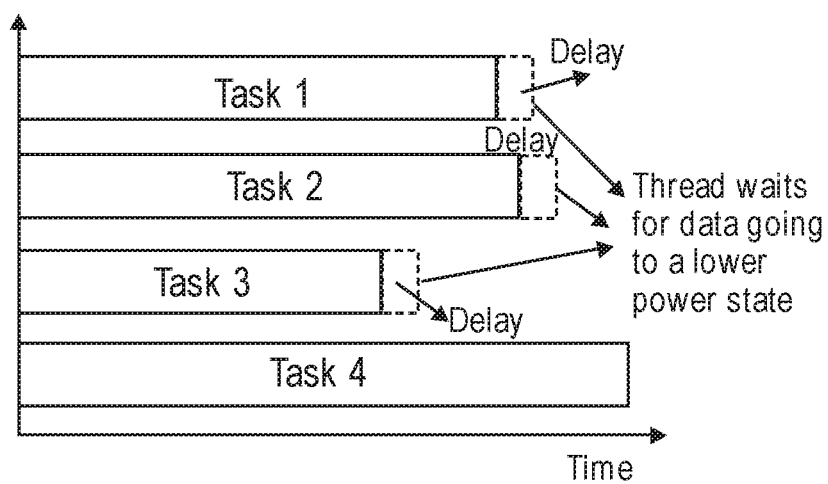

FIGS. 2A-2D show timing diagrams of operation according to embodiments of the invention. In FIG. 2A, four tasks, task 1, task 2, task 3 and task 4 are shown as part of the execution environment. As shown, each of tasks 1, 2 and 3 finish (reach a synchronization point) before task 4. In this example, each thread executing the corresponding task transitions to a lower power state immediately when it reaches a respective synchronization point. FIG. 2B is the same as FIG. 2A, except that tasks 1, 2 and 3 each wait a hold off delay before entering the lower power state. During the delay, each task enters a spin loop during the delay.

FIGS. 2C and 2D show behavior of the system with short and long messages respectively. Empirically message traffic tends to be bimodal characterized by either short or long messages. Where the messages are long message division can provide additional power savings. FIG. 2C shows a receiving task R waiting for a sending task S to send a message. When the message is receiving and validated, it exits the low power state, and the receiving task, task R, resumes. However, there is a finite delay to exit the low power state after the message has been received and validated. This is reflective of appropriate behavior when the message is relatively short.

FIG. 2D shows an embodiment for messages subdivided into two submessages, MSG 1 and MSG 2. This allows task R to initiate the transition from the low power state upon validation of MSG 1. This allows task R to resume processing and begin processing of MSG 1 while receiving MSG 2, thereby improving performance. Even in a system where task R is merely residing in a spin loop, this message subdivision can improve power because the time spent in the spin loop (not performing any useful work) is reduced over systems in which task R waits in a spin loop for the receipt of the entire lengthy message (here, the composition of MSG 1 and MSG2). This behavior is suitable where the message is long.

Figure 3:
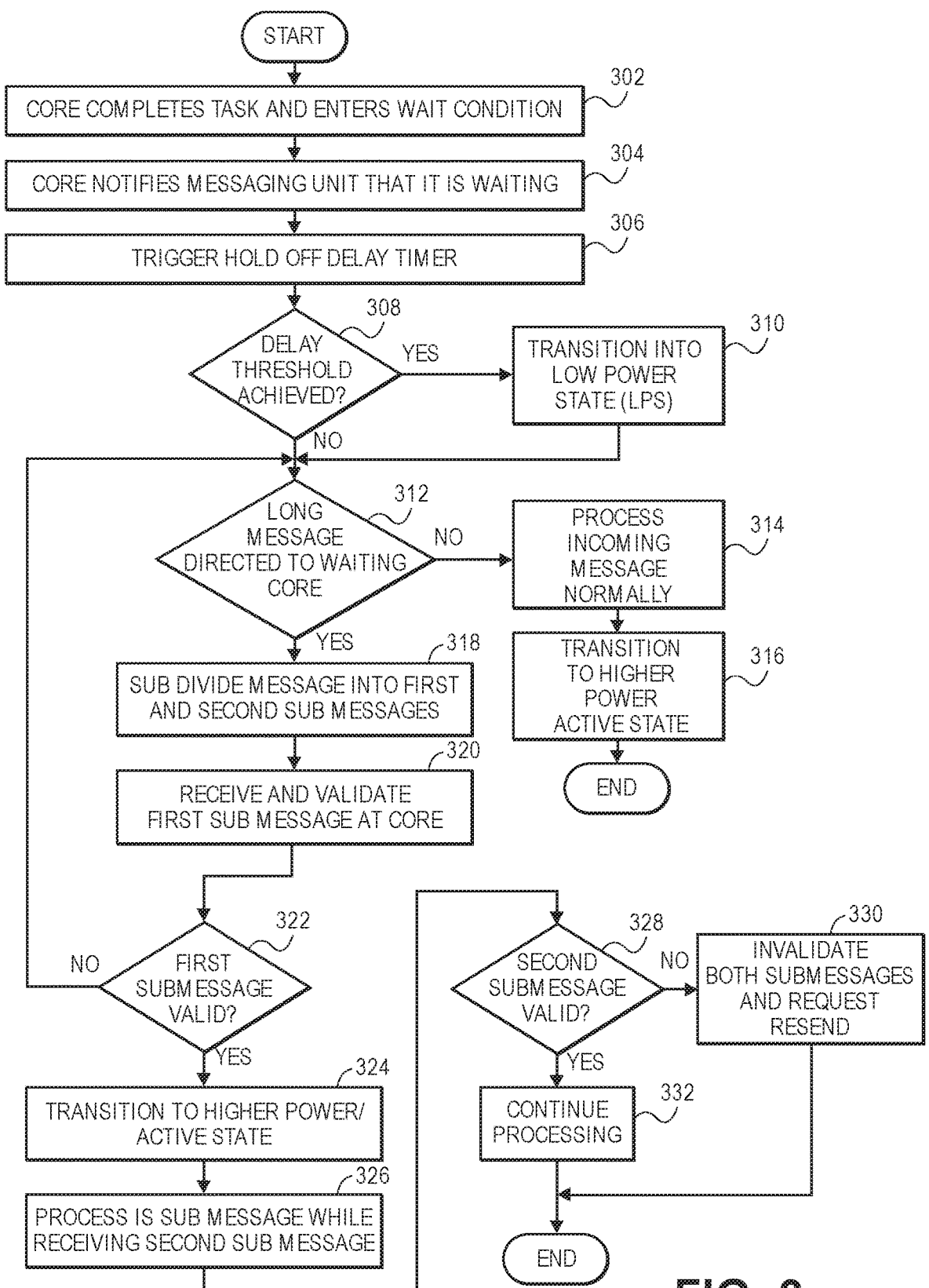
FIG. 3 is a flow diagram of operation of a system according to one embodiment of the invention.

FIG. 3 is a flow diagram of operation of a system according to one embodiment of the invention. At block 302, a core completes its task (arrives at a synchronization point) and enters a wait condition. At block 304, the core notifies a messaging unit that it is waiting. At block 306, a delay timer is triggered to hold off entry into a lower power state. Some embodiments may omit the delay timer or have the delay set to zero. At decision block 308, a determination is made if the delay threshold has been achieved. As noted previously, system designers may select the delay threshold based on the overhead of entry and leaving the low power state. If the delay threshold has been achieved, the core is transitioned into the lower power state (LPS) at block 310.

At decision block 312, a determination is made whether there is a long message directed at the waiting core. Empirically, as noted above, it has been found that most messages fall into a bimodal length distribution, that is, most messages are either very short, or quite long. If the message is not long, it is processed normally at block 314, that is, the message is not subdivided and is merely sent as a unit. Then, at block 316, the core transitions to the higher power state or active state at block 316 once the entire message has been validated.

Conversely, at block 318, if the message is a "long message," the message is subdividing into a first and second submessage, each with its validation values. At block 320, the core receives and validates the first submessage. A determination is made at block 322 if the first submessage is valid. If the first submessage is not valid, the core remains in a lower power state and waits for subsequent valid message receipt. If the first message is valid, upon validating that first message, the core transitions at block 324 into a higher power/active state, that is, it goes to a higher power, possibly C0 state, or exits a spin loop, for example. Then, at block 326, the core processes the submessage while receiving the second submessage. At block 328, a determination is made if the second submessage is valid. If the second submessage is not valid, the core invalidates both submessages and requests they be resent at block 330. If, however, the second submessage is valid (the usual case), it continues processing in the normal manner at block 332.

The following examples pertain to further embodiments. The various features of the different embodiments may be variously combined with some features included and others excluded to suit a variety of different applications. Some embodiments pertain to a multi-processing-core system in which a plurality of processing cores are each to execute a respective task. An inter-core messaging unit is to convey messages between the cores. A power management agent, in use, transitions a first core into a lower power state responsive to the first core waiting for a second core to complete a second task.

In further embodiments, the system uses a delay timer to hold off a transitioning into the lower power state for a defined time after the first core begins waiting.

In further embodiments, the messaging unit segments a message into a first submessage and a second submessage for transmission to the first core, and the power management agent transitions the first core to a higher power state responsive to receipt and validation of the first submessage.

In further embodiments, the first core begins processing the first submessage while the second submessage is being received.

Some embodiments pertain to a method to reduce power consumption in a multi-core execution environment. A first core is transitioned into a reduced power state responsive to a task executing on the core reaching a synchronization point, a threshold before a second task executing on a second core reaches the synchronization point. The first core is returned to a higher power state responsive to the second task reaching the synchronization point.

In further embodiments, a delay timer is initiated to hold off the transition until after the threshold.

In further embodiments, the delay timer is triggered based on a call of a messaging wait routine from the first task.

In further embodiments, when a message is to be sent to the first task in the reduced power state, the message is subdivided into a first submessage and a second submessage, each with a correction code value. The first submessage and the second submessage are sent to the first core. The return to the higher power state is initiated once the first submessage is validated.

In further embodiments, the first submessage begins processing while receiving the second submessage and the first submessage is invalidated responsive to a validation failure of the second submessage.

Some embodiments pertain to a method of reducing power consumption into a multi-core messaging. A first task is placed in a spin loop to wait for a message from a second task. The message is subdivided into a first submessage and a second submessage. The first task exits the spin loop responsive to a validation of the first submessage.

In further embodiments, the first submessage is processed in the first task while receiving the second submessage and invalidates responsive to a validation failure in the second submessage.

Some embodiments pertain to a non-transitory computer-readable medium having instructions stored therein, which when executed by a processor, cause the processor to perform a set of operations to reduce power consumption in a multi-core execution environment. A first core is transitioned into a reduced power state responsive to a task executing on the core reaching a synchronization point, a threshold before a second task executing on a second core reaches the synchronization point. The first core is returned to a higher power state responsive to the second task reaching the synchronization point.

In further embodiments, a delay timer is initiated to hold off the transition until after the threshold.

In further embodiments, the delay timer is triggered based on a call of a messaging wait routine from the first task.

In further embodiments, when a message is to be sent to the first task in the reduced power state, the message is subdivided into a first submessage and a second submessage, each with a correction code value. The first submessage and the second submessage are sent to the first core. The return to the higher power state is initiated once the first submessage is validated.

In further embodiments, the first submessage begins processing while receiving the second submessage and the first submessage is invalidated responsive to a validation failure of the second submessage.

Some embodiments pertain to the high-performance computing system having a plurality of processing cores. The system includes means for inter-core messaging and means for reducing power consumption on a first core when the first core is waiting for a second core.

In further embodiments, the means for inter-core messaging has means for subdividing a message into a first submessage and a second submessage, and wherein a receiving core begins processing of the first submessage before the second submessage is fully received.

In further embodiments, the means for reducing power consumption includes means for reducing a clock frequency in the processing core.

In further embodiments, the means for reducing power consumption includes means for transitioning the waiting core into a lower power state.

While embodiments of the invention are discussed above in the context of flow diagrams reflecting a particular linear order, this is for convenience only. In some cases, various operations may be performed in a different order than shown or various operations may occur in parallel. It should also be recognized that some operations described with respect to one embodiment may be advantageously incorporated into another embodiment. Such incorporation is expressly contemplated.

Elements of embodiments of the present invention may also be provided as a machine-readable medium for storing the machine-executable instructions. The machine-readable medium may include, but is not limited to, flash memory, optical disks, compact disks read only memory (CD-ROM), digital versatile/video disks (DVD) ROM, random access memory (RAM), erasable programmable read-only memory (EPROM), electrically erasable programmable read-only memory (EEPROM), magnetic or optical cards.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A multi-processing-core system comprising:
a plurality of processing cores, each processing core to execute a task, wherein the processing cores include a first core and a second core;
an inter-core messaging unit to convey messages between the plurality of processing cores;
a power management agent to transition the first core into a lower power state responsive to the first core waiting for the second core to complete a second task; and
a delay timer to hold off the transition into the lower power state for a defined time after the first core begins to wait.

2. The multi-processing-core system of claim 1, wherein the inter-core messaging unit segments a message into a first submessage and a second submessage for transmission to the first core, and wherein the power management agent transitions the first core to a higher power state responsive to receipt and validation of the first submessage.

3. The multi-processing-core system of claim 2, wherein the first core begins to process the first submessage while the second submessage is being received.

4. A method to reduce power consumption in a multi-core execution environment, the method comprising:
transitioning a first core into a reduced power state responsive to a task executing on the first core reaching a synchronization point, a threshold before a second task executing on a second core reaches the synchronization point, including initiating a delay timer to hold off the transition until after the threshold; and
returning the first core to a higher power state responsive to the second task reaching the synchronization point.

5. The method of claim 4, further comprising:
triggering the delay timer based on a call of a messaging wait routine from the first task.

6. The method of claim 4, wherein a message is to be sent to the first task in the reduced power state, and wherein the method further comprising:
subdividing the message into a first submessage and a second submessage, each with a correction code value;
sending the first submessage and the second submessage to the first core; and
initiating the return to the higher power state once the first submessage is validated.

7. The method of claim 6, further comprising:
processing the first submessage while receiving the second submessage; and
invalidating the first submessage responsive to a validation failure of the second submessage.

8. A method of reducing power consumption into a multi-core messaging system, the method comprising:
placing a first task in a spin loop to wait for a message from a second task;
subdividing the message into a first submessage and a second submessage; and
exiting the spin loop in the first task responsive to a validation of the first submessage.

9. The method of claim 8, further comprising:
processing the first submessage in the first task while receiving the second submessage; and
invalidating the first submessage responsive to a validation failure in the second submessage.

10. A non-transitory computer-readable medium having instructions stored therein, which when executed by a processor, cause the processor to perform a set of operations to reduce power consumption in a multi-core execution environment, the set of operations comprising:
transitioning a first core into a reduced power state responsive to a task executing on the core reaching a synchronization point, a threshold before a second task executing on a second core reaches the synchronization point, including initiating a delay timer to hold off the transition until after the threshold; and returning the first core to a higher power state responsive to the second task reaching the synchronization point.

11. The non-transitory computer-readable medium of claim 10, wherein the instructions cause the processor to perform a set of operations further comprising:

triggering the delay timer based on a call of a messaging wait routine from the first task.

12. The non-transitory computer-readable medium of claim 10, wherein the instructions cause the processor to perform a set of operations further comprising:

sending a message to the first task in the reduced power state;

subdividing the message to a first submessage and a second submessage, each with a correction code value;

sending the first submessage and the second submessage to the first core; and initiating the return to the higher power state once the first submessage is validated.

13. The non-transitory computer-readable medium of claim 12, wherein the instructions cause the processor to perform a set of operations further comprising:

processing the first submessage while receiving the second submessage; and invalidating the first submes sage responsive to a validation failure of the second submessage.

14. A high-performance computing system comprising:

a plurality of processing cores, including a first core, a second core, and a receiving core;

means for inter-core messaging, the means for inter-core messaging comprises:

means for subdividing a message into a first submessage and a second submessage, and wherein the receiving core begins processing of the first submessage before the second submessage is fully received; and means for reducing power consumption on the first core when the first core is waiting for the second core.

15. The high-performance computing system of claim 14, wherein the means for reducing power consumption comprises:

means for reducing a clock frequency in a processing core of the plurality of processing cores.

16. The high-performance computing system of claim 14, wherein the plurality of processing cores includes a waiting core, wherein the means for reducing power consumption comprises:

means for transitioning the waiting core into a lower power state.

* * * * *